United States Patent
Parkman

(10) Patent No.: US 9,351,497 B1
(45) Date of Patent: May 31, 2016

(54) MEAT TENDERIZER

(71) Applicant: Phillip L. Parkman, Morton, MS (US)

(72) Inventor: Phillip L. Parkman, Morton, MS (US)

(*) Notice: Subject to any disclaimer, the term of this patent is extended or adjusted under 35 U.S.C. 154(b) by 0 days.

(21) Appl. No.: 14/757,343

(22) Filed: Dec. 19, 2015

Related U.S. Application Data

(60) Provisional application No. 62/125,759, filed on Jan. 13, 2015.

(51) Int. Cl.
*A22C 9/00* (2006.01)

(52) U.S. Cl.
CPC ........................... *A22C 9/008* (2013.01)

(58) Field of Classification Search
CPC ........... A22C 9/008; A22C 9/004; A22C 9/00
USPC ........ 452/141–145, 6, 8, 9, 102–105; 30/123, 30/124, 142, 171, 315, 316, 346, 356, 278, 30/280, 294, 314, 317, 320, 321, 340, 342, 30/344
See application file for complete search history.

(56) References Cited

U.S. PATENT DOCUMENTS

| | | | |
|---|---|---|---|
| 483,002 A | 9/1892 | Jordan | |
| 1,024,811 A * | 4/1912 | Stanton | A22C 9/008 452/141 |
| 1,789,930 A * | 1/1931 | Guth | A47G 21/023 241/169.2 |
| 2,189,957 A * | 2/1940 | Lundblad | A22C 9/008 30/307 |
| 2,519,095 A * | 8/1950 | Young | A22C 25/025 119/600 |
| 2,881,846 A * | 4/1959 | Stromberg | A01B 1/06 172/350 |
| 3,892,988 A * | 7/1975 | Gran | A22C 9/00 173/101 |
| 4,200,958 A * | 5/1980 | Jurida | A22C 9/004 452/145 |
| 4,380,850 A * | 4/1983 | Coburn | A22C 9/008 452/145 |
| 4,959,905 A * | 10/1990 | Ghislain | B26B 29/025 30/151 |
| 6,438,850 B2 * | 8/2002 | Young | B26B 25/005 30/162 |
| 2011/0207389 A1* | 8/2011 | Deni | A22C 9/008 452/145 |
| 2012/0074252 A1 | 3/2012 | Kent | |

* cited by examiner

*Primary Examiner* — Richard Price, Jr.
(74) *Attorney, Agent, or Firm* — Timothy S. Stevens; Karen L. Kimble

(57) ABSTRACT

A meat tenderizer having a handle; a plurality of spaced apart curved blades; a plurality of cross bars; a right side plate; and a left side plate, the convex edges of the curved blades not being sharpened, the blades attached at each end thereof near one end of the side plates, the handle being attached at each end thereof near the other end of the side plates, the cross bars being attached to and across the concave edges of the blades. In addition, a method for tenderizing a cut of meat by rocking a plurality of curved blades into a cut of meat, the convex edges of the blades not being sharpened, the depth of impression of the blades into the meat being limited by a plurality of cross bars attached to and across the concave edge of the blades so that a portion of the fibers of the meat are severed by the impression of the blades into the meat thereby tenderizing the cut of meat.

5 Claims, 4 Drawing Sheets

MEAT TENDERIZER

BACKGROUND OF THE INVENTION

The instant invention relates to meat tenderizers and methods for tenderizing meat.

It is well known that meat can be tenderized by partially cutting the muscle fibers of meat with a sharp blade(s) or sharp spike(s). "Cube steak" is an example of meat that has been tenderized by sharp blades.

The meat tenderizer of U.S. Pat. No. 483,002 consisted of a number of parallel interspaced sharpened blades attached to a convex backing. In the method of U.S. Pat. No. 483,002, a steak or other cut of meat is placed on a cutting board and the tenderizer is pressed into and rocked across the meat to cut a portion of the fibers of the meat but leaving a portion of the meat uncut in the spaces between the sharpened blades.

A problem with meat tenderizers having sharpened blades or sharpened spikes is safety. Meat tenderizers having sharpened blades or spikes can cause accidental cuts to the user and especially to children learning to cook. Many prior art meat tenderizers are difficult to clean. It would be an advance in the art of meat tenderizing if a meat tenderizer were discovered that was safer to use and store and that could be more easily cleaned after use.

SUMMARY OF THE INVENTION

The instant invention is a meat tenderizer that is safer to use and store than meat tenderizers that comprise sharpened blades. Unlike many meat tenderizers of the prior art, the meat tenderizer of the instant invention is readily cleaned by hand washing or in a dishwasher. The meat tenderizer of the instant invention comprises a plurality of convex blades but the blades of the instant invention are not sharpened. The meat tenderizer of the instant invention also comprises a plurality of cross bars attached to the back of the convex blades. The cross bars limit the depth of impression of the blades into meat when the meat tenderizer of the instant invention is used to tenderize meat by rocking the blades onto a cut of meat.

More specifically, the instant invention is a meat tenderizer comprising: a handle; a plurality of spaced apart curved blades; a plurality of cross bars; a right side plate; and a left side plate, the convex edges of the curved blades not being sharpened, the blades being attached at each end thereof near one end of the side plates, the handle being attached at each end thereof near the other end of the side plates, the cross bars being attached to and across the concave edges of the blades.

In addition, the instant invention is a method for tenderizing meat, the method comprising the step of: rocking a plurality of curved blades into a cut of meat, the blades being spaced apart from each other, the convex edges of the curved blades not being sharpened, the depth of impression of the blades into the meat being limited by a plurality of cross bars attached to the concave edge of the blades in a direction across the longitudinal axis of the blades so that a portion of the fibers of the meat are severed by the impression of the blades into the meat thereby tenderizing the cut of meat.

DETAILED DESCRIPTION OF THE INVENTION

Figure 1:
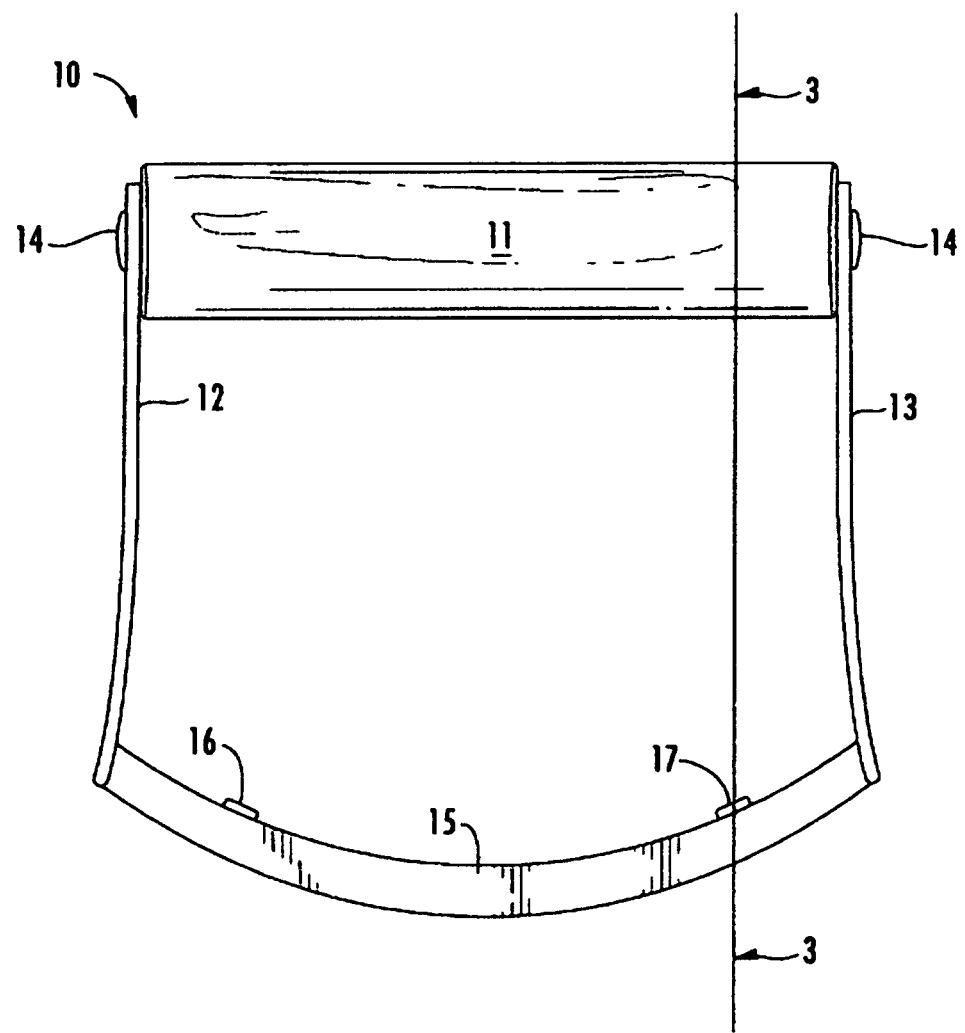
FIG. 1 is a side view in full of a preferred article of the instant invention.

Referring now to FIG. 1, therein is shown a side view in full of a preferred article 10 of the instant invention. The article 10 comprises left side plate 12 and right side plate 13 constructed of 14 gauge stainless sheet steel. A wooden handle 11 is attached at each end thereof to the upper end of the side plates 12 and 13 by stainless steel rivet 14. The article 10 also comprises a plurality of convex 14 gauge stainless sheet steel blades, one of which blades is the blade 15 attached at each end thereof to the lower end of side plates 12 and 13 by welding. A cross bar 16 constructed of 14 gauge stainless sheet steel is welded to the back side of the blade 15. A cross bar 17 constructed of 14 gauge stainless sheet steel is welded to the back edge of the blade 15.

Figure 2:
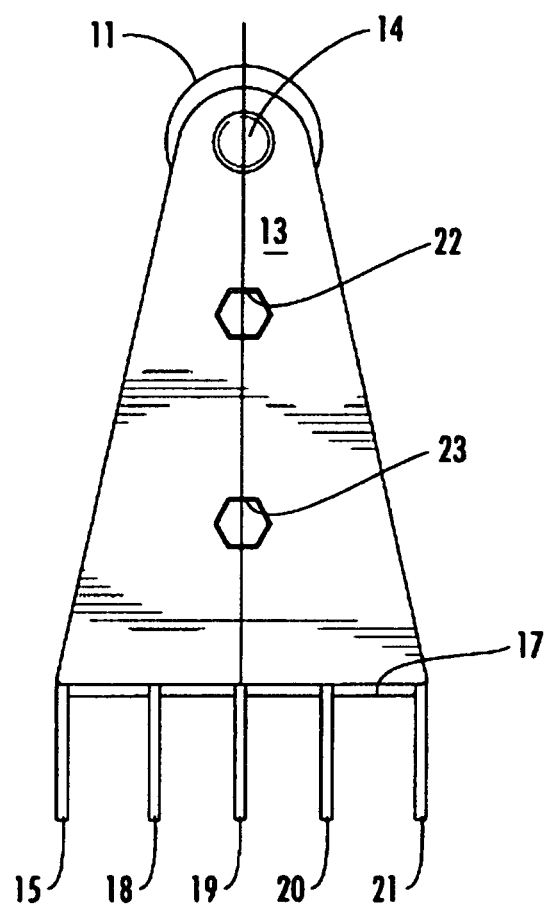
FIG. 2 is an end view in full of the article shown in FIG. 1.

Referring now to FIG. 2, therein is shown an end view in full of the article 10 shown in FIG. 1. Right side plate 13 is perforated with decorative apertures 22 and 23. FIG. 2 also shows curved blades 18, 19, 20 and 21, also constructed of 14 gauge stainless sheet steel and also welded at each end there of the side plates. FIG. 2 also shows cross bar 17 which is welded at one end to the back edge of blade 15 and to the back edge of blade 21. Referring now to FIGS. 1 and 2, the blades 18, 19, 20 and 21 are spaced apart and longitudinal axes of the blades 18, 19, 20, and 21 are parallel to each other. In addition, the longitudinal axes of the cross bars 16 and 17 are perpendicular to the longitudinal axes of the blades.

Figure 3:
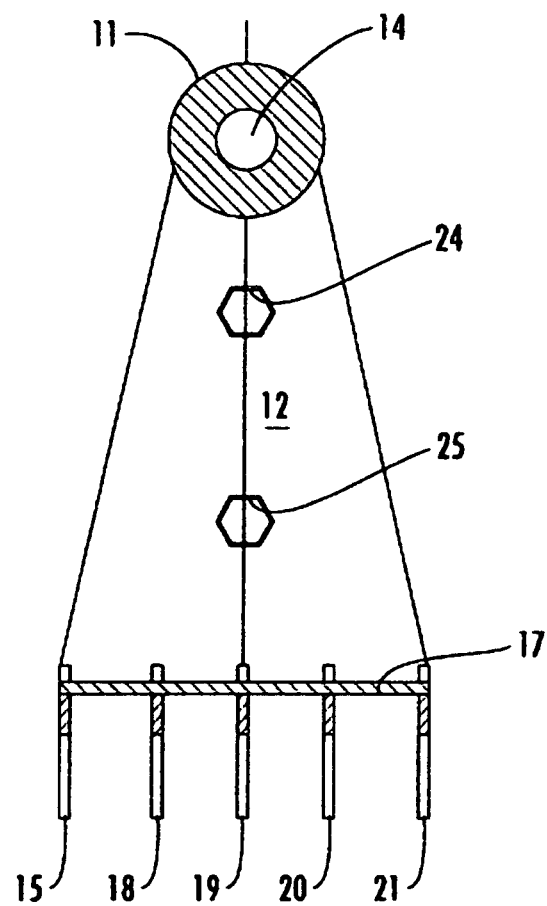
FIG. 3 is a cross-sectional view of the article shown in FIG. 1, cross-sectioned along the line 3-3 of FIG. 1.
Figure 4:
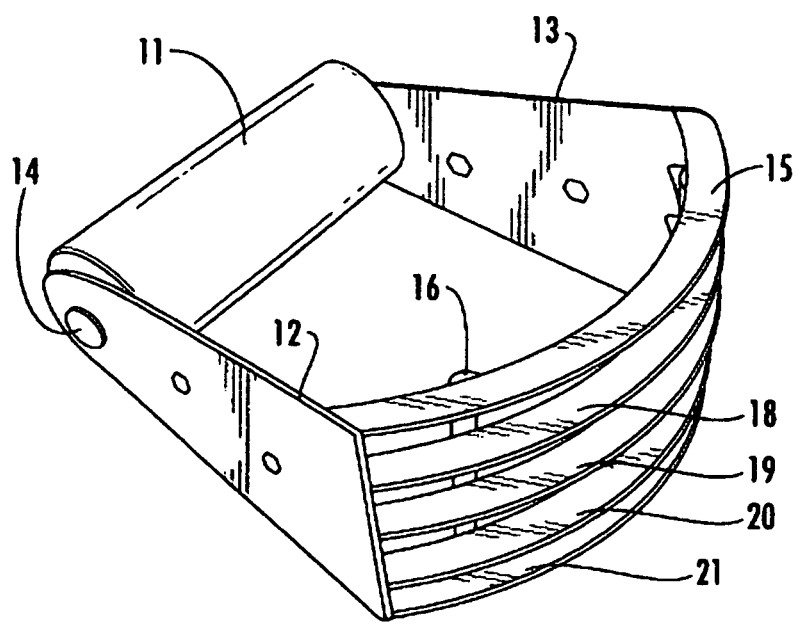
FIG. 4 is a perspective view in full of the article shown in FIG. 1.

Referring now to FIG. 3, therein is shown a cross-sectional view of the article 10 shown in FIG. 1, cross-sectioned along the line 3-3 of FIG. 1. Referring now to FIG. 4, therein is shown a perspective view in full of the article 10 shown in FIG. 1.

The article 10 is used to tenderize a cut of meat by wrapping a hand on the handle 11 and rocking the convex edge of the blades against a cut of meat so that the blades 15, 18, 19, 20 and 21 are impressed into the meat so that a portion of the fibers of the meat are severed by the rocking impression of the blades into the meat thereby tenderizing the cut of meat. The cross bars 16 and 17 serve to limit the depth of impression of the blades into the meat.

The material of construction for the side plates and blades of the instant invention is preferably a kitchen grade of stainless steel. However, the blades and side plates can be made of any suitable material such as a metal or plastic material. The meat tenderizer of the instant invention can even be made as an integral unit by plastic injection molding. The handle of the instant invention can be made of any suitable material such as wood, plastic or metal. For example, in one embodiment, the handle is a stainless steel tube welded to stainless steel side plates. The blades of the instant invention can be welded to the side plates or can be integral with the side plates by stamping the side plates and blades as an integral unit from, for example, sheet stainless steel and then bending the blades to form a structure not unlike a number of commercially available dough blenders (such as the CUISINART brand dough blender). The blades and side plates and cross bars of the instant invention preferably have a thickness of about 0.08 inches but can be any suitable thickness.

The convex edges of the blades of the instant invention are not sharpened. The term "not sharpened" used herein is defined herein as a blade edge having a radius equal to or more than 0.001 inch. As a result, the tenderizer of the instant invention can be rocked in the palm of a hand with little danger of cutting the hand and can be stored in a kitchen drawer with little danger of an accidental cut to a person retrieving items from the drawer. In FIGS. 2 and 3 the blades 15, 18, 19, 20 and 21 have flat bottoms intersecting with the sides of the blades, which intersections are the edges of the blades, which intersections have a radius of about 0.003 inch.

CONCLUSION

While the instant invention has been described above and claimed below according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A meat tenderizer comprising: a handle; a plurality of spaced apart curved blades; a plurality of cross bars; a right side plate; and a left side plate, the convex edges of the curved blades not being sharpened, the blades being attached at each end thereof near one end of the side plates, the handle being attached at each end thereof near the other end of the side plates, the cross bars being attached to and across the concave edges of the blades.

2. The article of manufacture of claim 1, wherein the longitudinal axes of the blades are parallel to each other and the longitudinal axes of the cross bars are perpendicular to the longitudinal axes of the blades.

3. The article of manufacture of claim 1, wherein the handle, side plates, blades and cross bars are made of stainless steel.

4. The article of manufacture of claim 2, wherein the handle, side plates, blades and cross bars are made of stainless steel.

5. A method for tenderizing a cut of meat, the method comprising the step of: rocking a plurality of convex edges of curved blades into a cut of meat, the convex edges of the curved blades not being sharpened, the depth of impression of the blades into the meat being limited by a plurality of cross bars attached to and across the concave edges of the blades so that a portion of the fibers of the meat are severed by the impression of the blades into the meat thereby tenderizing the cut of meat.

* * * * *